United States Patent [19]
Oe et al.

[11] Patent Number: 5,711,589
[45] Date of Patent: Jan. 27, 1998

[54] PLANE LIGHT SOURCE UNIT

[75] Inventors: Makoto Oe; Issei Chiba, both of Kawasaki, Japan

[73] Assignee: Mitsubishi Rayon Co., Ltd., Tokyo, Japan

[21] Appl. No.: 630,467

[22] Filed: Apr. 10, 1996

Related U.S. Application Data

[63] Continuation of Ser. No. 79,820, Jun. 22, 1993, abandoned.

[51] Int. Cl.$^6$ ............................................. F21V 7/04
[52] U.S. Cl. ............................ 362/31; 362/26; 362/330
[58] Field of Search ........................... 362/31, 32, 26, 362/330

[56] References Cited

U.S. PATENT DOCUMENTS

| | | |
|---|---|---|
| 4,648,690 | 3/1987 | Ohe . |
| 4,714,883 | 12/1987 | Lang ............................. 362/31 |
| 4,729,067 | 3/1988 | Ohe . |
| 4,729,068 | 3/1988 | Ohe . |
| 4,775,222 | 10/1988 | Ohe . |
| 5,089,944 | 2/1992 | Oe et al. . |
| 5,093,765 | 3/1992 | Kashima et al. ............... 362/31 |
| 5,126,882 | 6/1992 | Makoto et al. . |
| 5,136,480 | 8/1992 | Pristash et al. ............... 362/31 |
| 5,178,447 | 1/1993 | Murase et al. ............... 362/31 |
| 5,193,899 | 3/1993 | Oe et al. . |

FOREIGN PATENT DOCUMENTS

| | | |
|---|---|---|
| 0500 960 | 9/1992 | European Pat. Off. . |
| 59-33077 UM | 2/1984 | Japan . |
| 61-171001 | 10/1986 | Japan . |
| 1-107406 | 4/1989 | Japan . |
| 1-244490 | 9/1989 | Japan . |
| 1-245220 | 9/1989 | Japan . |
| 1-252933 | 10/1989 | Japan . |
| 2-17 | 1/1990 | Japan . |
| 2-84618 | 3/1990 | Japan . |
| 2-176629 | 7/1990 | Japan . |

OTHER PUBLICATIONS

F&M Feinwerktechnik & Messtechnik, vol. 100, No. 4, Apr. 1992, pp. 116–118, E. Jostes, "Neue Wege Der Display-–Hinterleuchtung".

IBM Technical Disclosure Bulletin, vol. 33, No. 9, Feb. 1991, pp. 261–262, "High Efficiency Back Light for LCD".

IBM Technical Disclosure Bulletin, vol. 29, No. 11, Apr. 1987, pp. 4838–4839, "Backlighting for Liquid Crystal Display".

Primary Examiner—Stephen F. Husar
Attorney, Agent, or Firm—Oblon, Spivak, McClelland, Maier & Neustadt, P.C.

[57] ABSTRACT

A plane light source unit which may be advantageously used as a backlighting means for a liquid crystal display device, and which includes a transparent light guide having a side end surface as a light incident surface, a surface perpendicular to the light incident surface as a light emitting surface, and a light reflecting layer provided on an opposite surface to the light emitting surface; and a second element having a large number of prism units formed on the light emitting surface of the transparent light guide which receives the light emitted from the transparent light guide and emits the light in a predetermined direction; wherein at least one of the light emitting surface and the opposite surface of said transparent light guide has a directional light emitting function which emits the incident light from the light incident surface of the transparent light guide in an oblique direction to the incident light and has a regulation function which makes the luminance of the light through the light emitting surface uniform over the whole surface thereof.

4 Claims, 11 Drawing Sheets

FIG. 15(a)
LIGHT GUIDE-1

SAMPLE 1—① LUMINANCE AT +65° 551cd/m²
SAMPLE 1—② LUMINANCE AT 0° 612cd/m²

FIG. 15(b)
LIGHT GUIDE-2

SAMPLE 3—① LUMINANCE AT 0° 196cd/m²
SAMPLE 3—② LUMINANCE AT 0° 212cd/m²

PLANE LIGHT SOURCE UNIT

This application is a continuation of application Ser. No. 08/079,820, filed on Jun. 22,1993, now abandoned.

BACKGROUND OF THE INVENTION

1. Field of the Invention

The present invention relates to a plane light source unit, and more particularly to a plane light source unit which may be advantageously used as a backlighting means for a liquid crystal display device or the like.

2. Description of the Related Art

Conventionally, a backlighting means for a liquid crystal display device or the like generally has such a construction that a linear lamp is located at a focus of a reflector having a parabolic section while a milk-white diffusing plate is located above the lamp. Various improvements were made to optimize the configuration of the reflector, to adjust the diffusion coefficient of the diffusing plate.

Special constructions have also been provided which employ such a combination of a linear lamp and a light guide, one side end of which is adjacent to the lamp, and the configuration of the light guide is simulated by approximation to a point source and worked into a curved surface so as to emit the light in a particular direction, or the thickness of the light guide is varied along the direction of light, or else a lenticular is used wherein the prism angle is varied in accordance with the distance from the lamp, or otherwise such configurations as described above are combined suitably.

Recently, plane light source units have been used as liquid crystal display units. However, the display device, which uses a conventional plane light source unit to obtain a high quality display, requires a thick plane light source unit. In particular, a plane light source unit for a large display with a size of 10 to 12 inches requires the conventional unit having a thickness of 20 to 30 mm. Therefore, the conventional unit is impossible to be used as a thin plane light source unit.

Various plane light source devices of edge-light types have been proposed. Each of these devices has a transparent light guide comprising a plate-shape transparent material such as an acrylic resin. Incident light from one end surface of the transparent light guide is then emitted from the upper or lower surface of the light guide. However, such a large liquid crystal display device with a size of 10 to 12 inches results in a display where luminance is decreased according to the distance from the light source or display with uneven luminance, so that a display of high quality cannot often be obtained.

In order to solve this problem, a light guide having a thickness which varies according to the distance from a lamp, or a member which changes light path geometrically, is provided. However, such a member having a specific shape requires a precise work to form, and thus it becomes expensive to prepare. Furthermore, this member does utilize only a small portion of the incident light to the member.

Recently, Japanese Patent Application Laid-open No. (Tokukai-Hei) 1-245220 disclosed a plane light source unit of an edge-light type. This plane light source unit has a light guide with a layer of a light diffusing material which is applied or adhered on the surface thereof opposite to a light emitting surface or on a light diffusing surface of a provided member. The density of the amount of the light diffusing material applied increases as the distance from the portion of light incidence increases. Japanese Patent Application Laid-open No. (Tokukai-Hei) 1-107406 disclosed a plane illuminating device which can uniformly illuminate the whole surface of a light diffusing plate. This device has a plurality of piled transparent plates, each of which has a different pattern of fine dots of light diffusing material thereon.

Since a non-light-transmissive inorganic material (e.g., white pigment such a titanium oxide or barium sulfate) is used, a loss of light occurs to lower the luminance of the emitted light.

Oe, one of the inventors of the present application, disclosed in U.S. Pat. No. 4,729,068 a light diffusing layer provided on the light guide through an intermediate layer having an intermediate characteristics of those of the light guide and the diffusing layer, and a light reflecting film (a light regulation member) to evenly illuminate the whole surface of the diffusing device.

The inventors of the present application proposed a plane light source unit which is an edge-light type, as described in Japanese Patent Application Laid-open Nos. (Tokukai-Hei) 1-244490 and 1-252933. This unit has a lens-like surface or a satin finished surface provided on at least one of a light emitting surface of a light guide and the opposite surface thereof, and a light regulation member having a light reflecting pattern which reflects most of the light near the light source but transmits almost all light near its central part, and a light diffusing plate provided on the emitting surface of the light guide.

The light diffusing device and the plane light source unit using the light regulation member show excellent effects regarding the uniformity in luminance of the emitted light. The device and the unit, however, cannot utilize the light which is reflected by the light regulating member, and accordingly the luminance of the emitted light lowers near the minimum value of the luminance before the regulation.

To provide a plane light source unit with an uniform and high luminance, the inventors of the present application proposed in U.S. patent application Ser. No. 07/849,365 filed on May 5, 1992, now abandoned, a plane light source unit which is characterized in that at least one of the light emitting plane and the opposite surface of the transparent light guide has a directional light emitting function which emits the incident light from the light incident surface of the transparent light guide in an oblique direction to the incident light and has a regulation function which makes the luminance of the light uniform over the light emitting surface in the whole surface thereof. This plane light source unit has been designed to emit light as uniformly as possible in all directions. However, it is desired to concentrate emitted light in a particular direction depending upon application of a plane light source.

For example, in the case of application to a liquid cryatal color TV set for personal use or a liquid crystal display for a personal computer having a comparatively small viewing angle, it is required to emit the light only in a particular direction and make the amount of emitted light as uniform as possible over an entire emitting surface.

The inventors of the present application disclosed, in U.S. Pat. No. 5,126,882 and Japanese Patent Application Laid-open Nos. (Tokukal-Hei) 2-17 and 2-84618, a plane light source unit comprising a first element having a lens-like surface or a satin finishied surface provided on at least one of a light emitting surface of a light guide and the opposite surface thereof, thereof, and a second element having a large number of prism units formed on the emitting surface which emitted the light from the emitting surface of the first element in a prescribed direction. This plane light source unit can easily form the light concentrated in a direction to be observed by a user. However, this unit is unsatisfactory in the uniformity and value of luminance of the emitted light.

SUMMARY OF THE INVENTION

It is an object of the present invention to provide a very thin type of a plane light source unit which can supply emitted light with a uniform and high luminance, and which can readily produce light concentrated in a direction to be observed by a user without increasing the rate of power waste.

In order to attain the above object, according to the present invention there is provided a plane light source unit comprising a transparent light guide having a side end surface as a light incident surface, a surface perpendicular to the light incident surface as a light emitting surface, and a light reflecting layer provided on an opposite surface to the light emitting surface; and a second element having a large number of prism units provided on the light emitting surface of the transparent light guide which receives the light emitted from the transparent light guide and emits the light in a predetermined direction; wherein at least one of the light emitting surface and the opposite surface of said transparent light guide has a directional light emitting function which emits the incident light from the light incident surface of the transparent light guide in an oblique direction to the incident light and has a regulation function which makes the luminance of the light through the light emitting surface uniform over the whole surface thereof.

Generally, the amount of light from the light emitting surface which is incident on the light guide decreases as the distance from the light incident surface increases due to light emitting through the light emitting surface and light absorption inside the light guide. In the plane light source unit according to the present invention, the ratio of the flat areas increases as the distance from the light incident surface decreases. Therefore, even if the transparent light guide is thin, it is possible to emit light with a uniform luminance over the entire emitting surface. The incident light into the transparent light guide is not wasted and has a high utilization rate. Consequently, it is possible to produce emitted light having a uniform and high luminance without increasing the wattage of the light source. In addition to this advantage, the plane light source unit of the present invention can easily produce condensed light in a prescribed direction because of the second element having a large number of prism units. Therefore, the present invention provides a very thin type of plane light source unit which can be advantageously used as a backlighting means for a liquid crystal display device or the like.

BRIEF DESCRIPTION OF THE DRAWINGS

FIGS. 1(a) and (b) are sectional views showing a construction of a conventional plane light source unit.

DETAILED DESCRIPTION OF THE INVENTION

Figure 1:
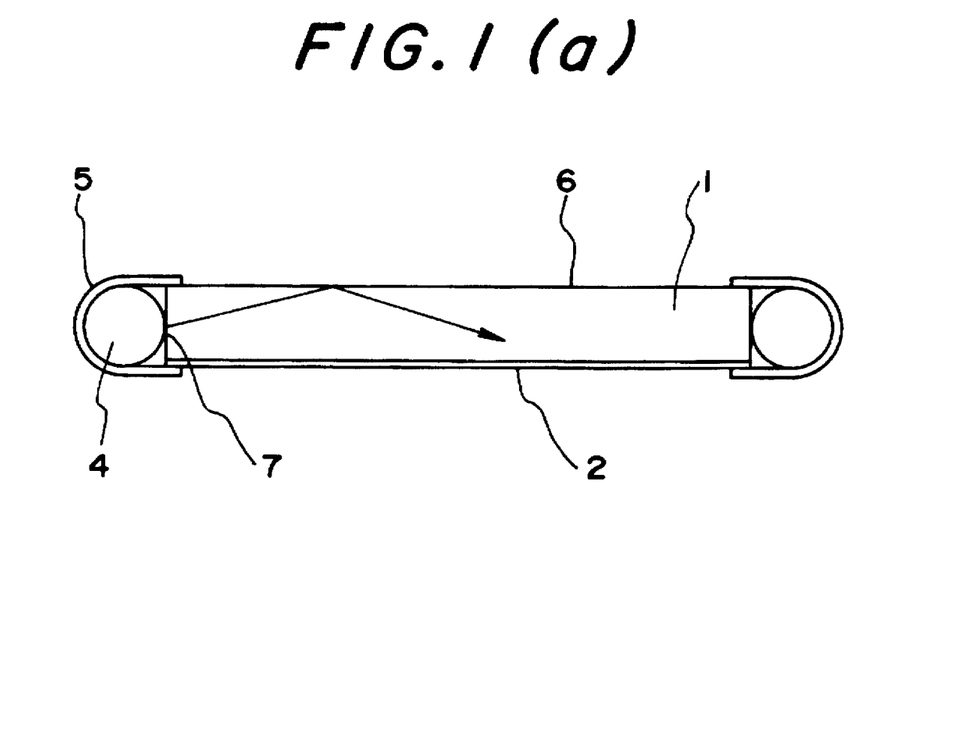

Prior to describing the preferred embodiments of the present invention, the basic principle of a plane light source unit according to the present invention will be explained. The refractive index n of a transition from a light guide to air is approximately 1.4 to 1.6. In the case of such an edge-light type of which the incident surface 7 is perpendicular to an emitting surface 6 as shown in FIG. 1(a), light theoretically cannot emit from the emitting surface 6 when the critical angle of incidence is about 45 degrees. In FIG. 1(a), reference numeral 4 indicates a light source such as a fluorescent lamp, reference numeral 5 indicates the reflector therefor, and reference numeral 2 indicates the reflective surface formed at the opposite surface of the emitting surface 6 of the light guide 1.

The emitting surface 6 is generally formed into light diffusion surface 6a or the reflecting surface 2 is formed into a light diffusing reflecting surface 9a as shown in FIG. 1(b).

The inventors of the present application studied a diffusing treatment for at least one of the surface of a light guide and the opposite surface thereof, in order to increase the amount of emitted light from the light guide. Consequently, the inventors have found that a method using surface roughening of these surfaces as uniformly as possible and a method using a plurality of lens units for emitting light in a predetermined direction is more effective than the method of using application of a light diffusing material on at least one of the surface of the light guide and the opposite surface thereof or the method of using formation of a light diffusing material layer on the surface when an acrylic plate is made by polymerizaiton.

Figure 2:
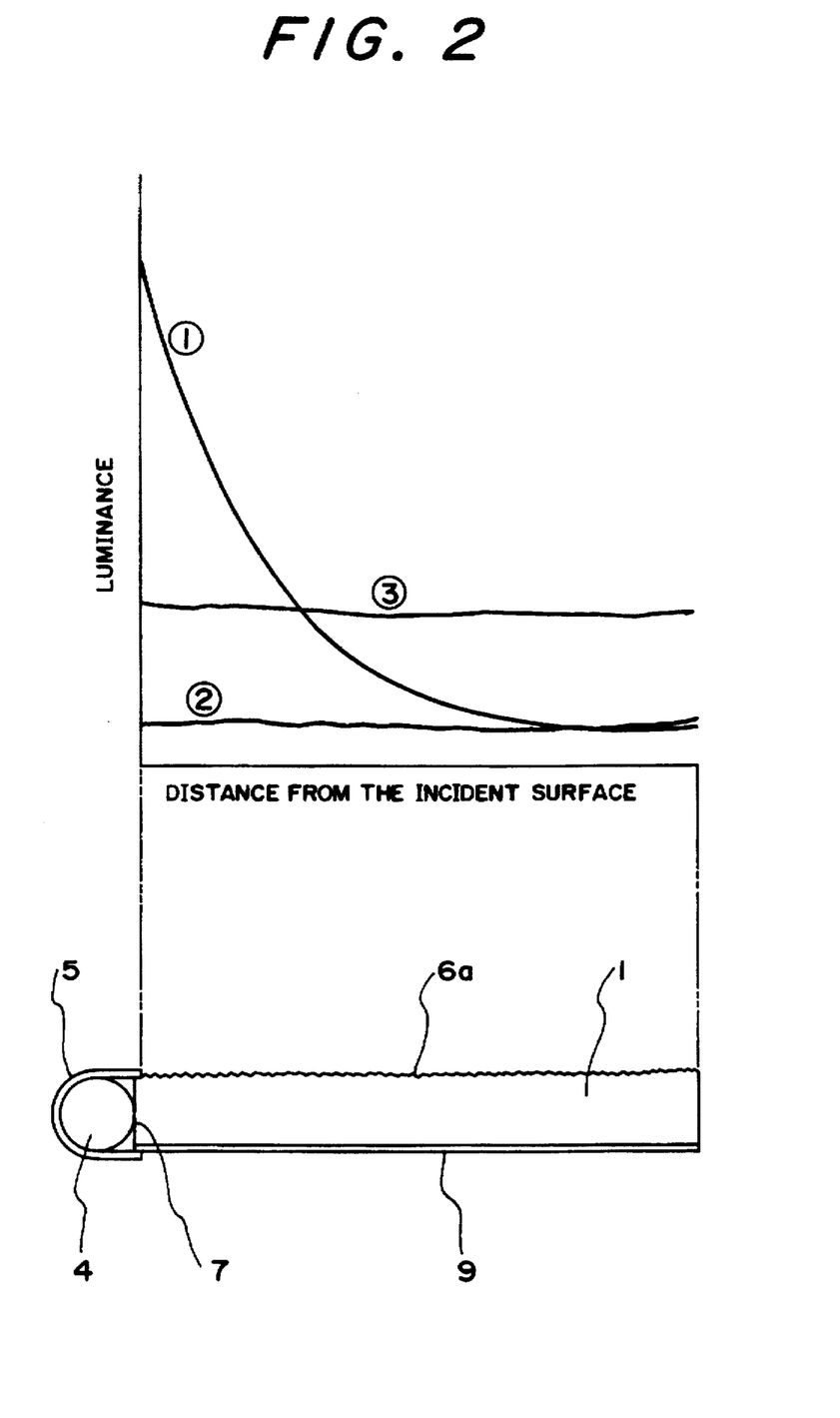
FIG. 2 is a view showing the change of luminance to the distance from the light incident surface of various kinds of plane light sources.

A plane light source unit comprising a light guide with a roughened surface, a fluorescent lamp with a surrounded silver-evaporated polyester film as a reflector provided on an end surface thereof, and a white film as a reflective member provided in contact with the roughened surface, was made to measure the luminance of the light emitted therefrom. The luminance of the emitted light decreases as the distance from the fluoroscent lamp increases. When the distance is 70 to 80 times the thickness of the light guide, the luminance is about 1/10 that at the distance zero. These results are shown by the line ① in FIG. 2. The inventors proposed uniformization of luminance by a light transmissive sheet for regulating the emitting light in Japanese Patent Application Laid-open Nos. (Tokukai-Hei) 1-244490 and 1-252933, as described above. According to this method, it is possible to make the luminance of the emitted light uniform. However, this method lowers the value of luminance of the overall emitted light to about 1/10 to 1.5/10 of that near the incident end portion. In this method, utilization of the incident light energy passing through the light guide is not performed efficiently. This is shown by the line ② in FIG. 2. The reason for this is that the light transmissive sheet for regulating the emitting light can cut the emitting light but cannot reutilize the cut light because of a regulating pattern reflecting the light.

Therefore, the inventors developed in U.S. patent application Ser. No. 07/849,365, now abandoned, a plane light source unit so as to utilize the incident light as efficiently as possible, in view of the above results. In this plane light source unit, the inventors did not use the regulating pattern of the light transmissive sheet for regulating the emitted light, or apply a light diffusing material on the opposite surface of the light emitting surface so that the density of the material was greater as the distance from the light incident portion was greater, as disclosed in Japanese Patent Application Laid-open No. (Tokukai-Hei) 1-245220. The inventors did use a transparent light guide, which is disclosed in Japanese Patent Application Laid-open Nos. (Tokukai-Hei) 2-17, 2-84618 and 2-176629, which can emit a large amount of light, and a smooth interface having a small optical loss of light to regulate the amount of emitted light so as to make the luminance value on the light emitting surface as high and uniform as possible. That is, in the plane light source unit according to the present invention, roughened surfaces or a plurality of lens units, each of which has a directional light emitting function which radiates the incident light from the light incident surface of the transparent light guide at an oblique direction to the incident light, were provided on at least one of the light emitting surface and the opposite surface thereof; and flat areas were provided on the toughened surfaces or the plural lens units so that the ratio of the flat areas thereon to the whole area of the roughened surfaces increased as the distance from the light incident surface decreased, thereby the transparent light guide had a regulation function which made the luminance of the light through the light emitting surface uniform over the whole surface thereof. By taking this structure, it is possible to increase the value of luminance of the overall emitted light to about 3/10 of that near the incident end portion and to obtain a plane light source unit showing a uniform luminance value over the entirety of the light emitting surface. This is shown by the line ③ in FIG. 2. However, in case this plane light source unit is used as a backlighting means for a liquid crystal TV or display means, it is further required to emit the light only in a particular direction. Thus, in the present invention the inventors have further incorporated the prism units disclosed in U.S. Pat. No. 5,126,882 and Japanese Patent Application Laid-open Nos. (Tokukai-Hei) 2-17 and 2-84618 into this plane light source unit.

(Embodiments)

The plane light source unit of the present invention will be discribed in more detail by referring to the embodiments.

(Plane Light Source Unit)

Figure 3:
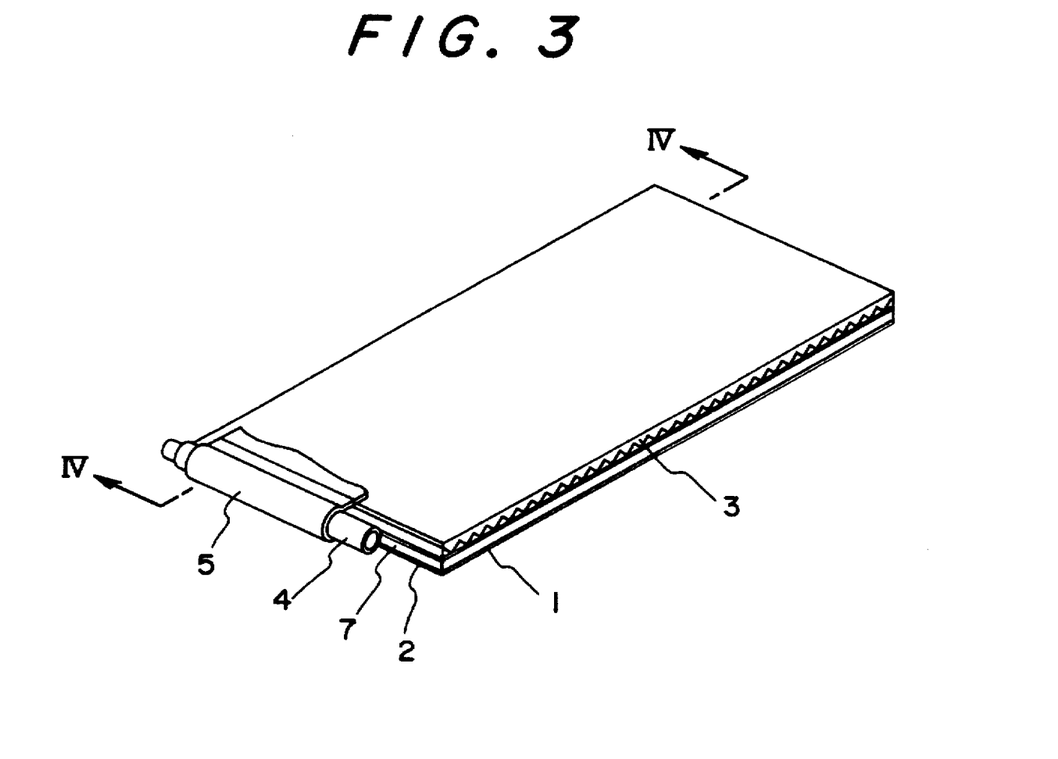
FIG. 3 is a partially fragmentary and perspective view showing a backlighting device incorporating a plane light source unit acccording to an embodiment of the present invention.
Figure 4:
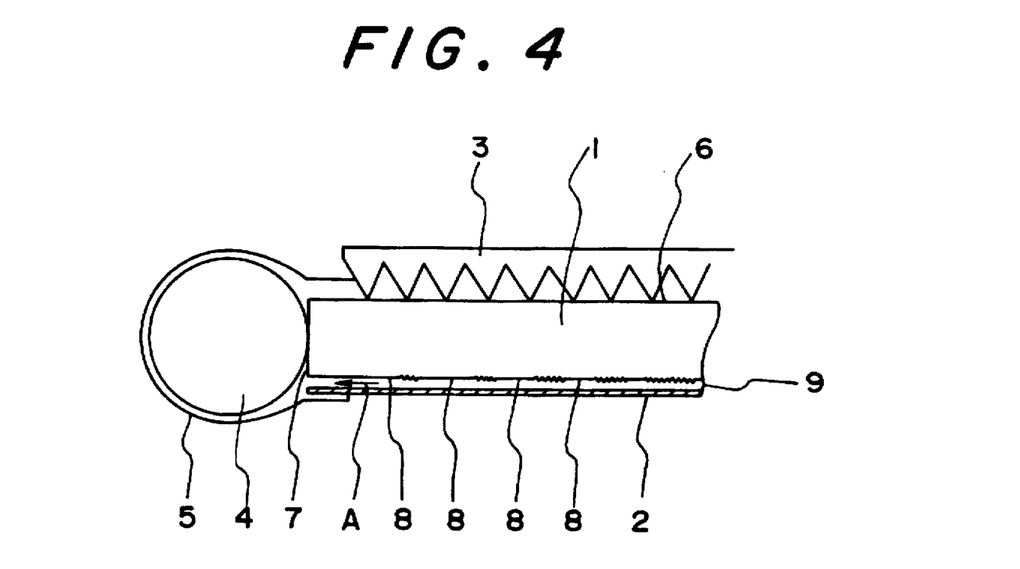
FIG. 4 is a partially sectional view taken along line IV—IV of FIG. 3.
Figure 5A:
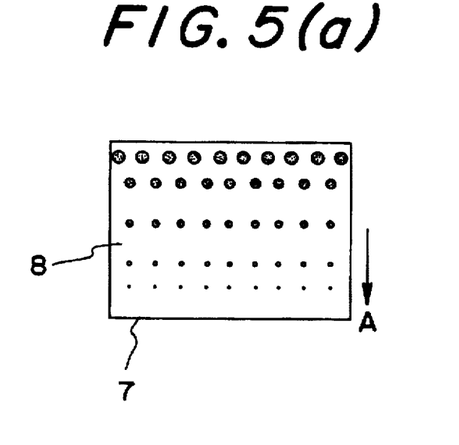
FIGS. 5(a)–(e) are schematic views showing embodiments of planar patterns of the flat areas.
Figure 5B:
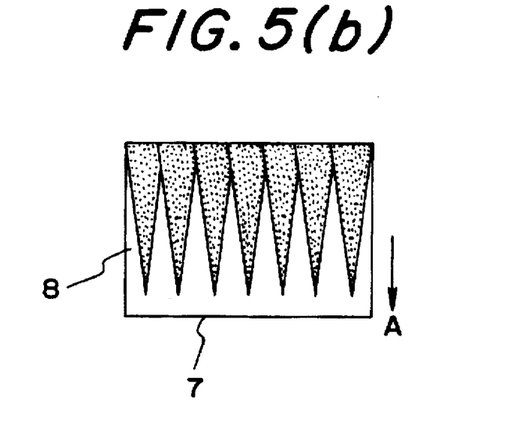
Figure 5C:
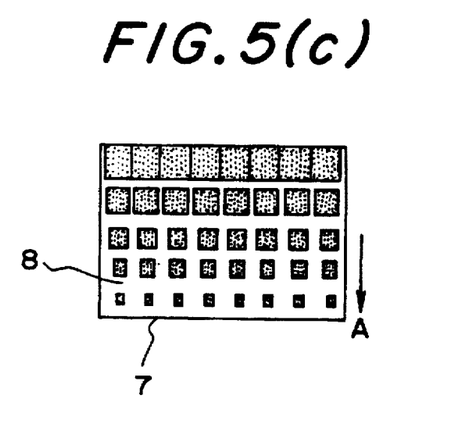
Figure 5D:
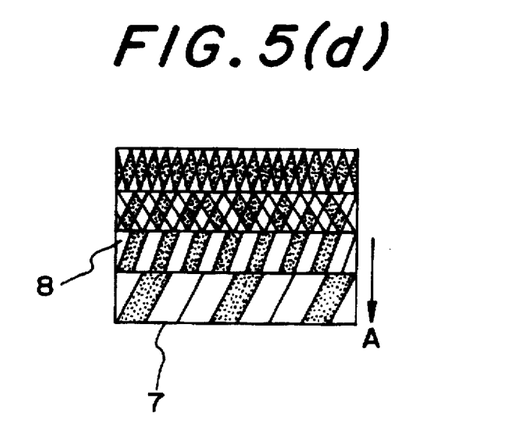
Figure 5E:
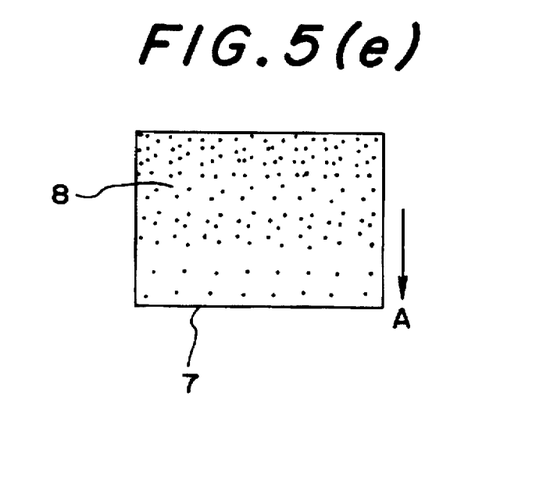

FIG. 3 shows an embodiment of a backlighting device incorporating a plane light source unit according to the present invention. FIG. 4 shows a partially sectional view taken along line IV—IV of FIG. 3.

The unit comprises a light guide 1 with a rectangular plate shape, an element 3 having the prism units provided on the light emitting surface 6, a light source 4 such as a fluorescent lamp provided on the side end surface (a light incident surface 7) of the light guide 1, and a reflector 5 for holding the light source 4 and reflecting the light to the incident surface by the reflective surface provided on the inner surface thereof. The opposite side of the light emitting surface 6 of the light guide 1 has a light reflective layer 2.

The plane light source unit according to the present invention is characterized in that roughened surfaces or a plurality of lens units, each of which has a directional light emitting function which emits the incident light from the light incident surface 7 of the transparent light guide 1 in an oblique direction to the incident light, are provided on at least one of the light emitting surface 6 and the opposite surface 9; and the flat areas 8 are provided on the roughened surfaces or the plural lens units so that the ratio of the flat areas thereon to the whole area of the roughened surfaces increases as the distance from the light incident surface 7 decreases, thereby said transparent light guide 1 has a regulation function which makes the luminance of the light through the light emitting surface 6 uniform over the entire surface thereof. The plane light source unit is further characterized by the element 3 having a large number of prism units which emits incident light in a predetermined direction.

In this embodiment, the flat areas 8 are provided on the roughened opposite surface 9 to the light emitting surface 6, so that the ratio of the flat areas 8 to the whole area of the surface 9 increases as the distance from the light incident surface 7 decreases, as shown by arrow A in FIG. 4.

The increasing ratio of the flat areas on the roughed surface of the light guide 1 can be selected, changed and determined appropriately according to the shape or pattern of the flat areas, the material or shape of the light guide, the kind of the light source, the treatment degree of the light emitting or reflecting surface or the like.

Pattern examples of the flat areas 8 are shown in FIGS. 5(a) to (e). In every example, the area ratio of the flat areas 8 to the whole area of the surface 9 increases as the distance from the light incident surface 7 to the flat areas 8 decreases, as shown by arrow A in FIGS. 5(a) to (e).

In the present invention, the second element having a large number of prism units is used to concentrate the light emitted from the light emitting surface of the light guide to a desired direction. In case the emitting surfaces 6a and 9a are formed into a light diffusing reflecting layer as shown in FIG. 1(b), almost all of the light from the emitting surfaces emit to the direction fallen within an angular range of 60 to 70 degrees with respect to the normal line to the emitting surface. To radiate the light from the emitting surfaces to the normal line, the second element having a large number of the prism units is employed.

Figure 6A:
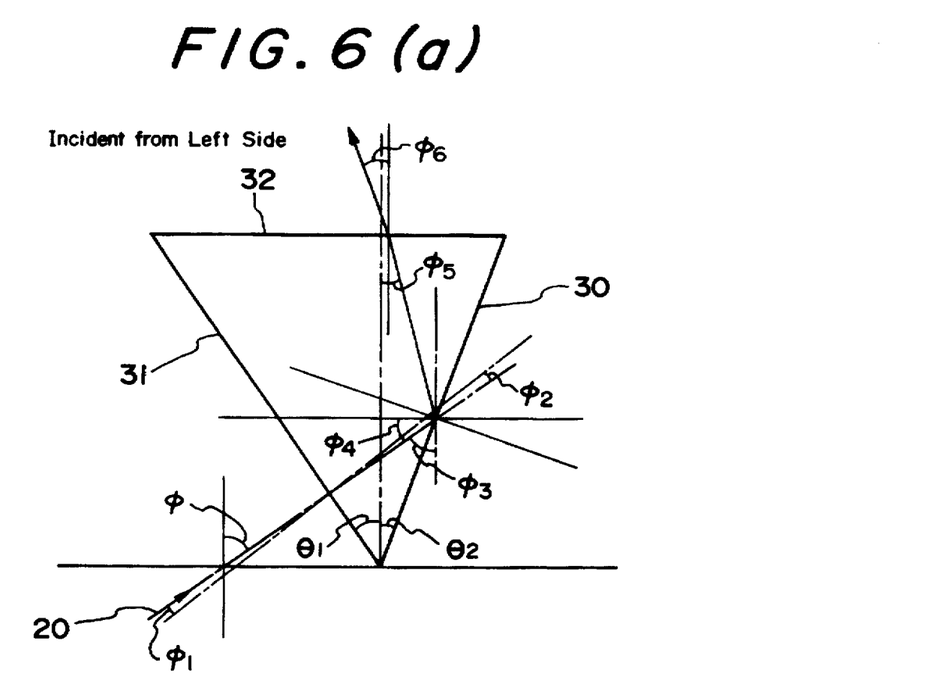
FIGS. 6(a) and (b) are diagrammatic representations showing paths of rays of light passing through a prism unit.
Figure 6B:
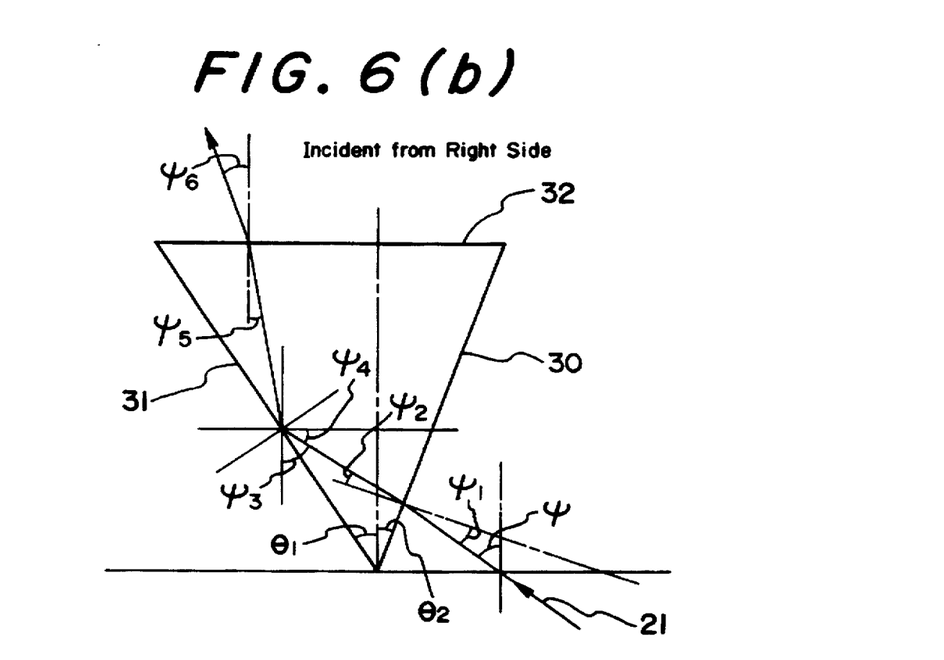

FIGS. 6(a) and 6(b) are diagrammatic representations showing of one of such prisms of the second element as described Just above. In FIGS. 6(a) and 6(b), reference numerals 20 and 21 represent emergent rays of light in the rightward and leftward directions, respectively. $\theta_1$ and $\theta_2$ represent angles made by the normal lines and surfaces 31 and 30 of the prism, respectively, and reference numeral 32 represents an emitting surface (a second light emitting surface) of the prism. Further, reference symbols $\psi^1$ to $\psi^6$ and $\phi_1$ to $\phi_6$ denote angles of rays with respect to the individual surfaces of the prism or reference lines. The angles are taken as shown in FIGS. 6(a) and 6(b).

Referring to FIG. 6(b), if a ray of light enters the prism from the right-hand side like a ray 21, it enters through the prism surface 30, then is totally reflected by the prism surface 31, and then emerges from the prism through the emitting surface 32 at a predetermined angle $\psi_6$. To the contrary, referring to FIG. 6(a), if a ray of light enters the prism from the left-hand side like a ray 20, it enters through the prism surface 31 and then is totally reflected by the prism surface 30 whereafter it emerges at the predetermined angle $\phi_6$ from the prism through the emitting surface 32. The predetermined angles $\psi_6$ and $\phi_6$ can attain nearly the same values by changing the prism angles $\theta_1$ and $\theta_2$. The second element having the prism units can be provided on the light guide 1 by the end portion of the light guide adhering to the second element with an adhesive, by compulsory close contact through pressure, or by merely positioning the second element on the light guide. Furthermore, it is possible to laminate the light guide 1 and the second element directly or through a layer of air.

The light guide 1 in the present invention can be obtained by a transparent resin such as an acrylic resin, a polycarbonate resin or a vinyl chloride resin. In particular, it is preferable to use an acrylic resin having a large transmission coefficient of visible light. The method of molding the light guide 1 can be selected or changed appropriately.

The light source 4 in the present invention is not limited. A fluorescent lamp or a filament lamp which is a continuous linear light source, a plurality of point-like sources of light arranged along the incident surface, or a light source device comprising a combination of a light transmissive member which can receive light through a side surface and a light source provided near the end portion incident surface of the light transmissive member, can be used as a light source.

The reflecting layer 2 of the plane light source unit according to the present invention can be formed by laminating a reflecting film or the like which comprises a film and an evaporated metal such as Ag, Al or the like.

In the present invention, the light guide 1 requires at least one of the light emitting surface 6 and the opposite surface being roughened, or a plurality of lens units being formed. Furthermore, it is necessary to provide flat areas on the roughened surface or on the surface on which a plurality of lens units are formed, so that the ratio of the flat areas thereon to the whole area increases as the distance from the light incident surface decreases.

In a preferred embodiment of the present invention, the surface of the flat areas 8 of the light guide 1 is preferably an optically flat surface, in particular, to be a mirror surface. The incident light with an incident angle more than the critical reflective angle to the optical flat surface can be reflected without any substantial loss.

Since the light does not leak, it is possible to utilize the light effectively to increase the value of luminance of the entire light emitting surface.

Figure 7:
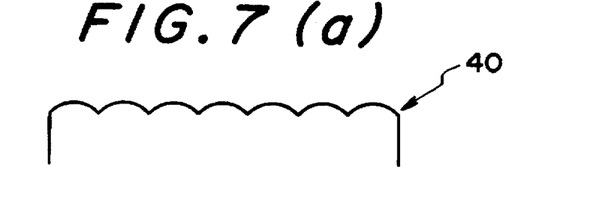
FIGS. 7(a)–(c) are schematic sectional views showing various kinds of lens units.

The shape of the lens unit which is used in the present invention is not limited. For example, a lens unit with a shape proposed in Japanese Patent Application Laid-open No. (Tokukai-Hei) 2-17 by the inventors can be used. Lenses 20 having various shapes are shown in FIGS. 7(a), (b) and (c).

The roughened surface which is used in the present invention preferably has a haze value as measured by the method of ASTM-D 1003-61 of not less than 30%, and more preferably, not less than 50% in the roughened surface portion.

Figure 8:
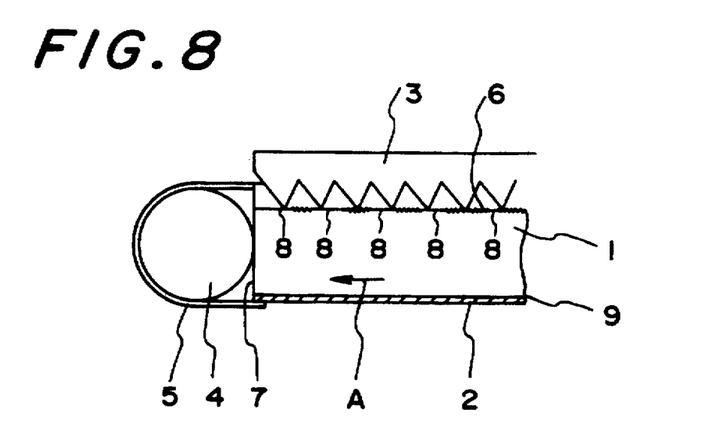
FIGS. 8 and 9(a)–(c) are partially sectional views showing modified embodiments of the plane light source unit of the present invention.

The plane light source unit according to the present invention is not limited to the above embodiment. Various changes or modifications in form and details may be made therein. For example, in the above embodiment, flat areas 8 are provided on the roughened surface 9 opposite to the light emitting surface 6. However, flat areas 8 can be provided on the roughened light emitting surface 6, as shown in FIG. 8. It is possible to provide a structure so that the area ratio of the flat areas thereon to the whole area of the roughened surface increases as the distance from the light incident surface 7 decreases, as shown by arrow A in FIG. 8.

Figure 9A:
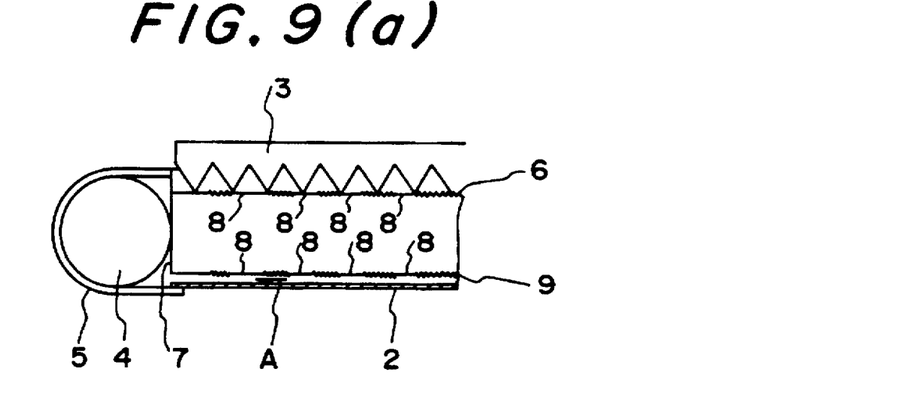
Figure 9B:
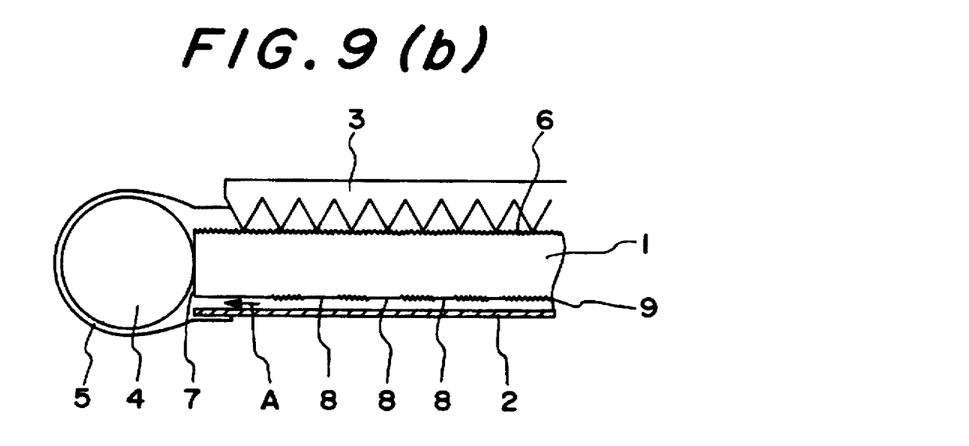
Figure 9C:
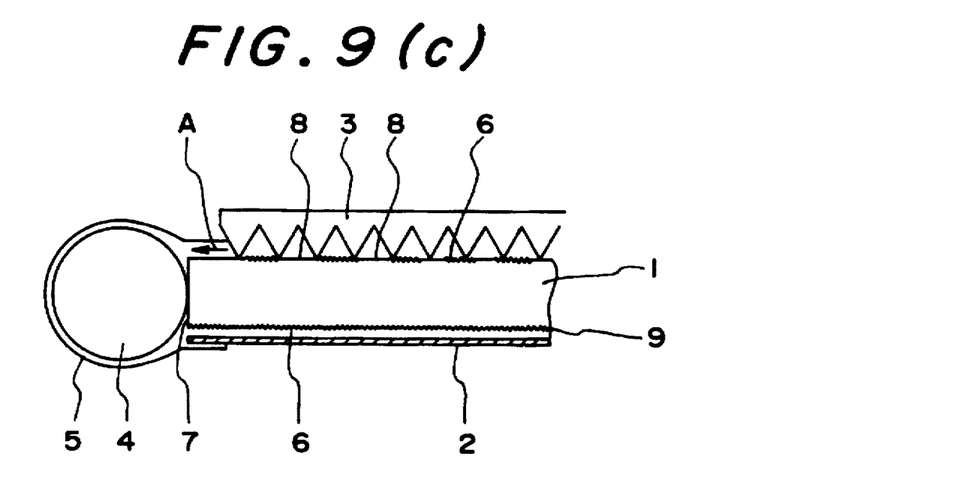

Furthermore, it is possible to provide the flat areas 8 on either or both roughened surfaces of the light emitting surface 6 and the opposite surface 9, as shown in FIG. 9(a), (b), or (c). In each embodiment, the area ratio of flat areas 8 thereon to the whole area has to be designed to increase as the distance from the light incident surface 7 decreases, as shown by arrow A in FIG. 9(a), (b), or (c).

Figure 10:
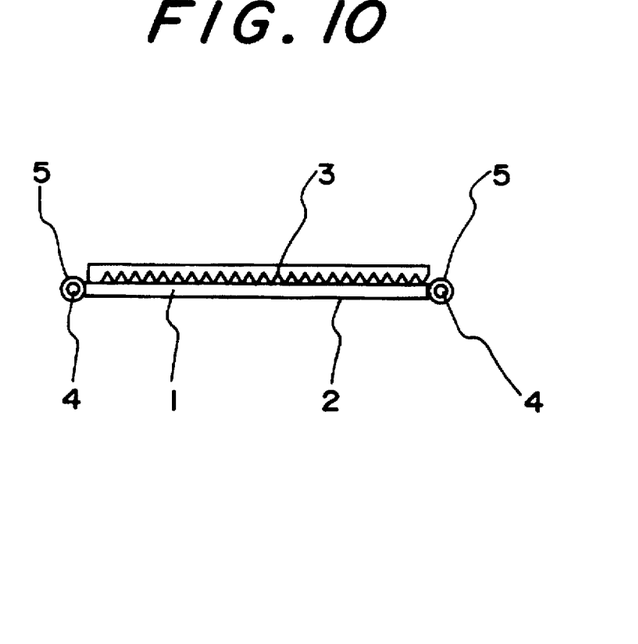
FIG. 10 is a schematic side view showing a modified embodiment of a backlighting device.

In the above embodiments, the light source 4 is provided only on one end side of the light guide 1. It is also possible to provide the light source 4 on both ends sides of the light guide 1, as shown in FIG. 10.

(Regulating Method of the Plane Light Source Unit)

The plane light source unit according to the present invention can be regulated and manufactured by various kinds of methods.

For example, when the flat areas are provided on a roughened surface of the light guide or on a surface having lens units, it is possible to manufacture desired light guides by using a method in which flat areas are provided on a roughened surface or on a surface having lens units or by using a method in which roughened parts or lens units are provided on a flat surface.

A die having a desired roughened pattern or a surface roughness, or a die having specific lens units and flat areas is prepared by surface roughening treatments such as sandblasting, etching or the like. A light guide, which has predetermined flat areas on at least one of a light emitting surface having a roughened surface or lens units and opposite surface thereof, can be obtained by an injection molding of a resin or by a heat-press using such a die. In particular, the injection molding method is preferable because of high precision and high molding speed.

The manufacture of the plane light source unit can be performed by preparation of necessary member such as the light guide, the prism units, the reflecting material and the like, and by then assembling them.

(Detailed Explanation of Embodiments)

1) Manufacture of a die for the light guide

Glass beads were blown on a polished surface of a brass plate, so that a metal plate on which surface roughening is carried out by a usual forming process was manufactured ("Die 1").

Figure 11:
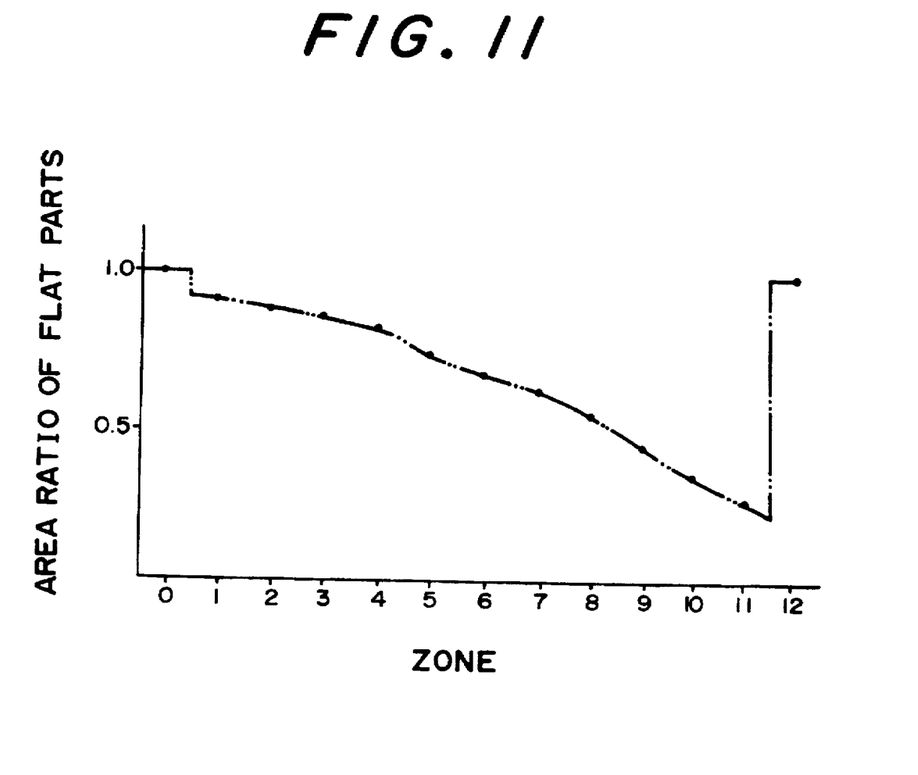
FIG. 11 is a graph showing an area ratio distribution of the flat areas in a planer pattern formed on a mold for manufacturing a light guide used for embodiments of the present invention.
Figure 12A:
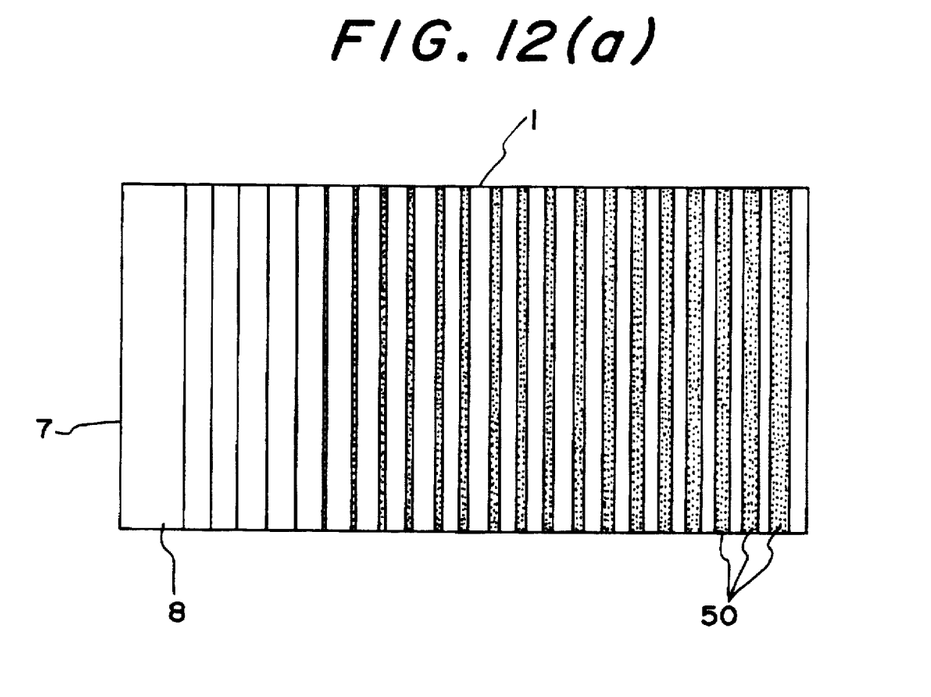
FIG. 12(a) and (b) are plan views showing a manufactured light guide.

A gradation pattern having a distribution of the area ratio of the flat areas as shown in FIG. 11 was formed by using a CAD system. A pattern was developed and printed photo-optically on the surface of Die 1 by a usual photolithography process. The portion to remain as roughened surfaces, that is the portion similar to the rough parts 22 as shown in FIG. 12(a), was protected by a film. The remaining portion was polished to a degree of roughness with an emery-paper No. 800. Thereafter, a die having predetermined flat areas was made by removing the protecting film ("Die 2").

A surface of a brass plate was polished by a buff with an emery-paper No. 800, and then a mirror plate was made ("Die 3").

A combined die for injection molding which had one surface with a state similar to that of Die 2 and had the other surface with a state similar to that of Die 3, was made ("Die 4").

2) Manufacture of the light guide

Figure 12B:
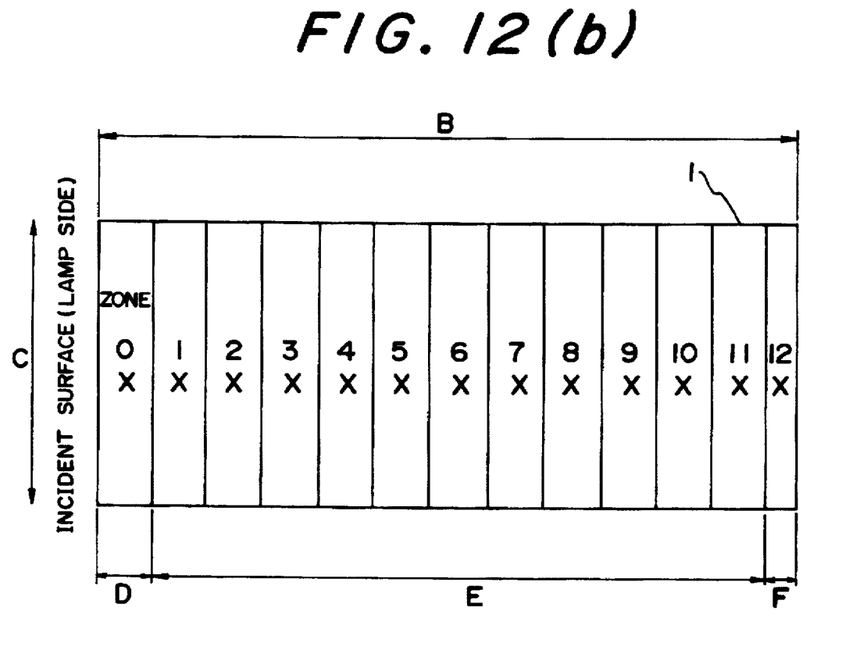

An acrylic resin plate of 150 mm×250 mm with a thickness of 3 mm was sandwiched between Die 2 and Die 3, and a replica was formed by a conventional heat-press process. Then, the replica was cut to the size and pattern position as shown in FIGS. 12(a) and (b). The four cut sides were polished to have mirror surfaces in a conventional manner ("Light guide 1").

In FIG. 12(a), reference numeral 50 indicates roughened surface parts. In FIG. 12(b), light guide 1 has a length (B) of 225 mm, a width (c) of 132 mm, a width of a zone "0" (D) of 15 mm, an effective width (E: a width of zones "1" to "11") of 205 mm, and a width (F) of zone "12" of 5 mm.

An acrylic resin plate of 150 mm×250 mm with a thickness of 3 mm was sandwiched between Die 1 and Die 3 using a process similar to the above process and a replica was formed by heat-pressing. Then, the replica was cut and polished to produce a light guide ("Light guide 2").

A negative EP picture was made as a comparative embodiment so that ink could be applied on the rough corresponding parts of Die 2 by a screen printing process. A print form for screen printing was made by using this. Screen printing was carried out on a surface of an acrylic resin plate of 150 mm×250 mm with a thickness of 3 mm using a commercially available white ink (VIC 120 White made by Seiko-Advance Co., Ltd.). Thereafter, this was cut and polished in a similar manner to that of light guide 1 or of light guide 2 to make a light guide for comparison ("Light guide 3").

A light guide was made from acrylic resin pellets (Acrypet VH made by Mitsubishi Rayon Co., Ltd.) at a cylinder temperature of 280° C. by using a 200 ton-injection molding machine and Die 4 ("Light guide 4").

3) Measurement of the haze value of light guide 2

Pieces of sample of 50 mm×50 mm were cut out from the roughened surface parts of light guide 2, and the haze value thereof was measured according to ASTM-D 1003-61. The haze value was calculated according to the following equation.

$$\text{Haze value} = \{(\text{Transmittance of diffused light})/(\text{Total transmittance light})\} \times 100\%$$

Consequently, the haze value of light guide 2 was 64.8.

4) Manufacture of the second element

To direct the emitted light from the emitting surface of the second element, i.e., from the final emitting surface of the plane light source unit, to the normal line, each prism was set to have an apex angle $(=\theta_1+\theta_2)$ of 63 degrees and $\theta_1=\theta_2=$ 31.5 degrees. To manufacture this prism element, a metal mold having a multi-prism pattern wherein the pitch was 0.38 mm and each of the thus set prisms had an apex angle$(=\theta_1+\theta_2)$ of 63 degrees was produced, and using the metal mold, the multi-prism pattern was transferred to an acrylic resin plate having a thickness of 1 mm by thermal press work to make the second element.

5) Assembly of the plane light source unit

A silver vacuum deposited polyester film with a thickness of 100 μm was cut into a sheet with a size of 132 mm×225 mm, and this sheet was used as reflecting layer 2.

As the lamp case, a cylindrical member having an inner diameter of 6 mm was prepared from a crystal white plate produced by Sky Aluminum Co., Ltd. (an aluminum plate with a thickness of 0.25 mm, a surface of which is coated with a white paint) by folding it and positioning the white surface as the inner surface. This lamp case was designed to have an apperture with an opening width of 3 mm.

The light guide was placed on light reflecting layer 2 so that the "0" zone as shown in FIG. 12(b) was adjacent to the short side of light reflecting layer 2 and the roughened surface or the printed surface of the light guide was close to the silver deposited surface of reflecting layer 2. The second element having the prism units was placed on the light guide. These three members were inserted into the aperture of the lamp case together. A lamp "KC 162 T4E54B" produced by Matsushita Electric Industry Corporation with a diameter of 4 mm and a length of 162 mm was set in the lamp case to prepare a plane light source unit. "CXA-L10L" produced by TDK Corporation was used as an inverter for lighting a lamp. This lamp was lit by application of DC 12V.

6) Measurement of luminance of the plane light source unit

Luminance of the plane light souce unit was measured by a luminance meter "BM-5" produced by Topcon Co., Ltd. through a view angle of 1 degree and a measurement circle of 10 to 15 mm in diameter. The measurement was carried out at each central portion of each zone "1" to "11" as shown in FIG. 12(b). The plane light source unit was fixed at a predetermined measurement pedestal perpendicularly thereto so that the lamp was in an upper side. After lighting had been carried out by application of DC 12V, the measurement was carried out through a lamp aging time of not less than 15 minutes. The condition of temperature for measurement was 23° C.±2° C.

7) Result of luminance measurement

Figure 13:
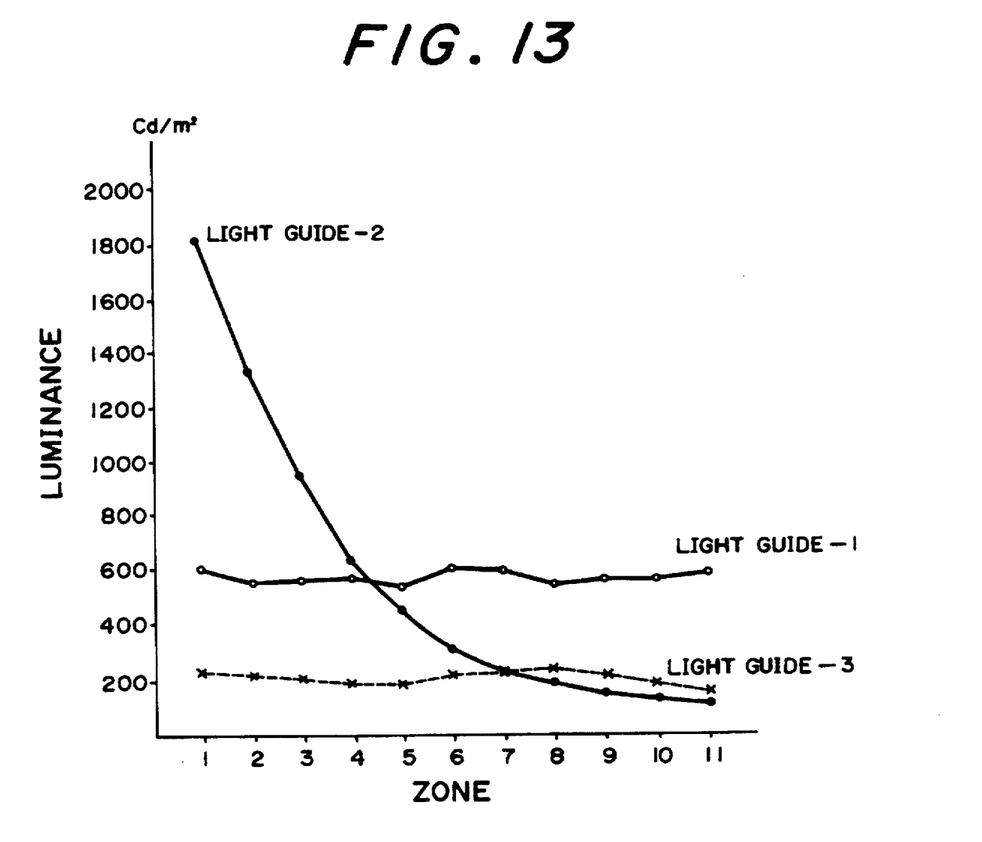
FIG. 13 is a graph showing a measurement result of a luminance distribution of the respective plane light source units.

Results of the luminance measurement is shown in Table 1 and FIG. 13. t.0220

Figure 14:
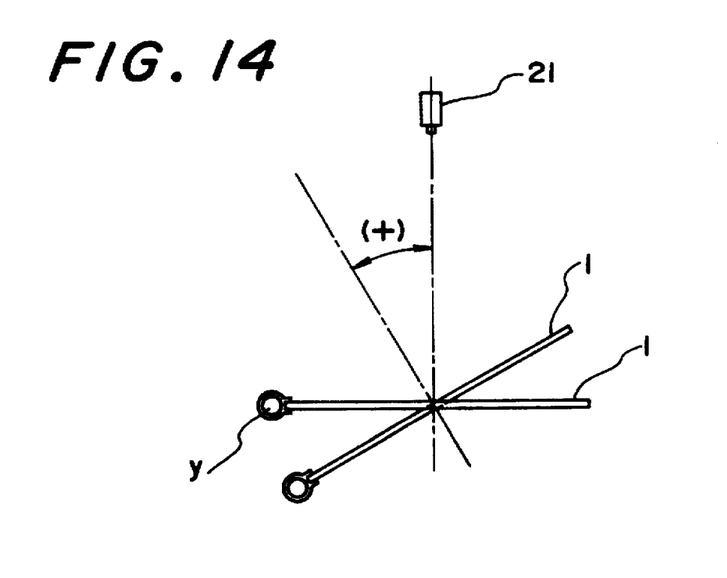
FIG. 14 is a schematic view showing a method for measuring directional emitting angles of a manufactured plane light source unit.

8) Measurement of directional emitting angle of the light guide and the plane light source unit A sample was placed on a measurement pedestal so that a lamp y was at the left side. The luminances at predetermined angles were measured, rotating the sample as shown in FIG. 14.

A sample in which the second element having the prism units was removed from a plane light source unit using light guide 3 is indicated as 3-①. A sample with the second element is indicated as 3-②.

The measurement position was fixed at the central portion of the zone 6 as shown in FIG. 12(b). The results are shown in FIGS. 15(a) and (b).

Figure 15A:
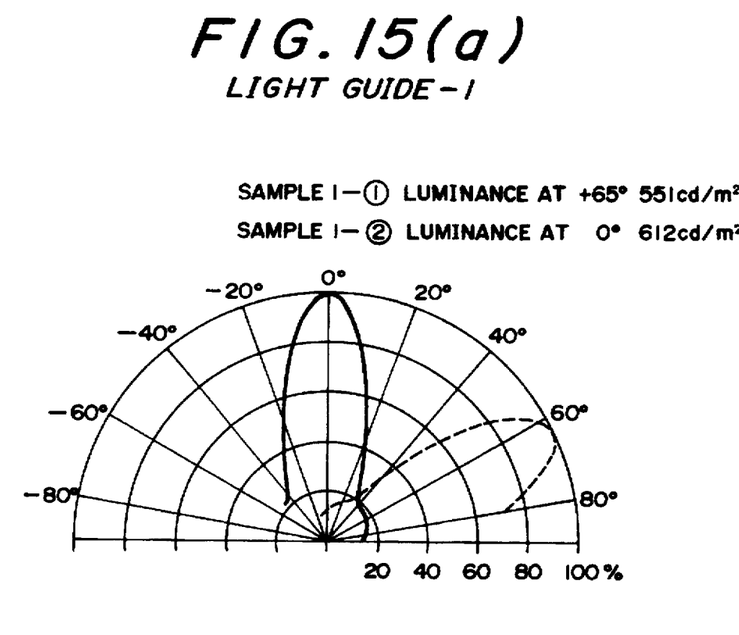
FIGS. 15(a) and (b) are graphs showing measurement results of directional emitting angles of manufactured plane light source units.
Figure 15B:
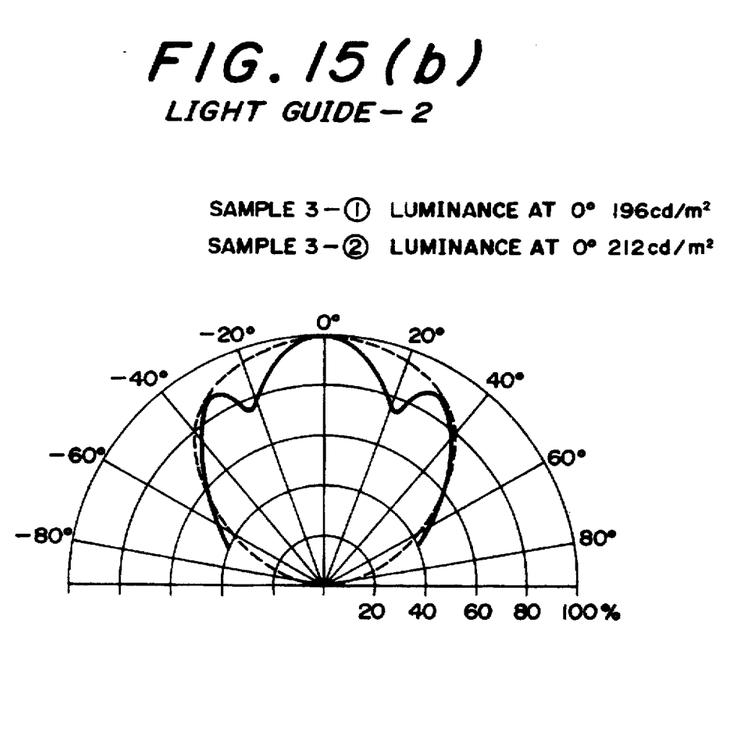

It is apparent from Table 1, FIG. 13 and FIG. 15, light guide 1 with the second element, an embodiment of the present invention, can emit light with approximately uniform luminance over the whole area of the light emitting surface. Besides this characteristic, almost all of the emitted light from the unit with the second element had the maximum luminance value in the direction of the normal line because of the existence of the second element (Sample 1-②; FIG. 15(a)). Light guide 1 without the second element emitted light had the maximum luminance value at 65 degrees, as shown in FIG. 15(a) (Sample 1-①).

On the other hand, sample 3, a comparative embodiment, can emit light with an approximately uniform luminance as shown in Table 1 and FIG. 13, and emitted light from sample 3 without the second element (i.e. sample 3-①) can emit the light having the peak luminance value in the direction of the normal line. Sample 3 with the second element (i.e. sample 3-②) emit the light having a similar direction distribution.

Surprisingly, the value of the maximum luminance value obtained in sample 1-② is about 3 times as high as that of obtained in sample 3-②.

A plane light source unit using light guide 4 gave similar results to those of the plane light source unit using light guide 1.

Since the plane light source unit according to the present invention has, on at least one of the light emitting surface and the opposite surface of said transparent light guide, (1)

a directional light emitting function which radiates the incident light from the light incident surface of the transparent light guide at an oblique direction to the incident light, (2) a regulation function which makes the luminance of the light uniform over the light emitting surface in the whole surface thereof, and (3) the second element having a large number of prism units which radiates the emitted light from the emitting surface of the light guide to a specific direction, the incident light emits in a specific direction from the whole area of the emitting surface of the plane light source unit with approximately uniform luminance, even in a very thin type of the plane light source unit. The incident light into the transparent light guide is not wasted and has a high utilization rate. Consequently, it is possible to produce an emitted light having a high luminance without increasing the wattage of the light source. Therefore, the present invention provides a very thin type of plane light source unit which can supply emitted light with a uniform and high luminance, and which can be advantageously used as a backlighting means for a liquid crystal display divice.

What is claimed is:

1. A plane light source unit, comprising:

a transparent light guide having a side end surface as a light incident surface, a surface perpendicular to the light incident surface as a light emitting surface, and a light reflecting layer provided on an opposite surface to the light emitting surface; and a second element having a large number of prism units provided on the light emitting surface of the transparent light guide which receives light emitted from the transparent light guide and at least either one of surfaces provided on each of said prism units providing a total reflection of the light emitted from the transparent light guide whereby each of said prism units emits the light in a predetermined direction;

wherein at least one of the light emitting surface and the opposite surface of the transparent light guide has a directional light emitting function which emits incident light from the light incident surface of the transparent light guide as a directional light having an angle of 60°–70° with respect to a line perpendicular to the light incident surface of the transparent light guide and has a regulation function which makes a luminance of the light through the light emitting surface uniform over a whole surface thereof;

the transparent light guide having roughened surface with the directional light emitting function opposite to the light emitting surface, the roughened surface having flat areas which form a surface of total reflection so that the ratio of the flat areas to the total area increases as the distance from the light incident surface decreases, so that the transparent light guide regulates the luminance of the light to be uniform over the entire light emitting surface.

2. A plane light source unit as claimed in claim 1; wherein the transparent light guide is produced by injection molding.

3. A plane light source unit as claimed in claim 1; wherein the haze value of the roughened surface formed on the transparent light guide is not less than 30%.

4. A plane light source unit as claimed in claim 1; wherein the transparent light guide comprises an acrylic resin.

* * * * *